Feb. 19, 1957    J. K. GAYLORD    2,781,874
BRAKE DRUM COOLING DEVICE
Filed Dec. 29, 1953
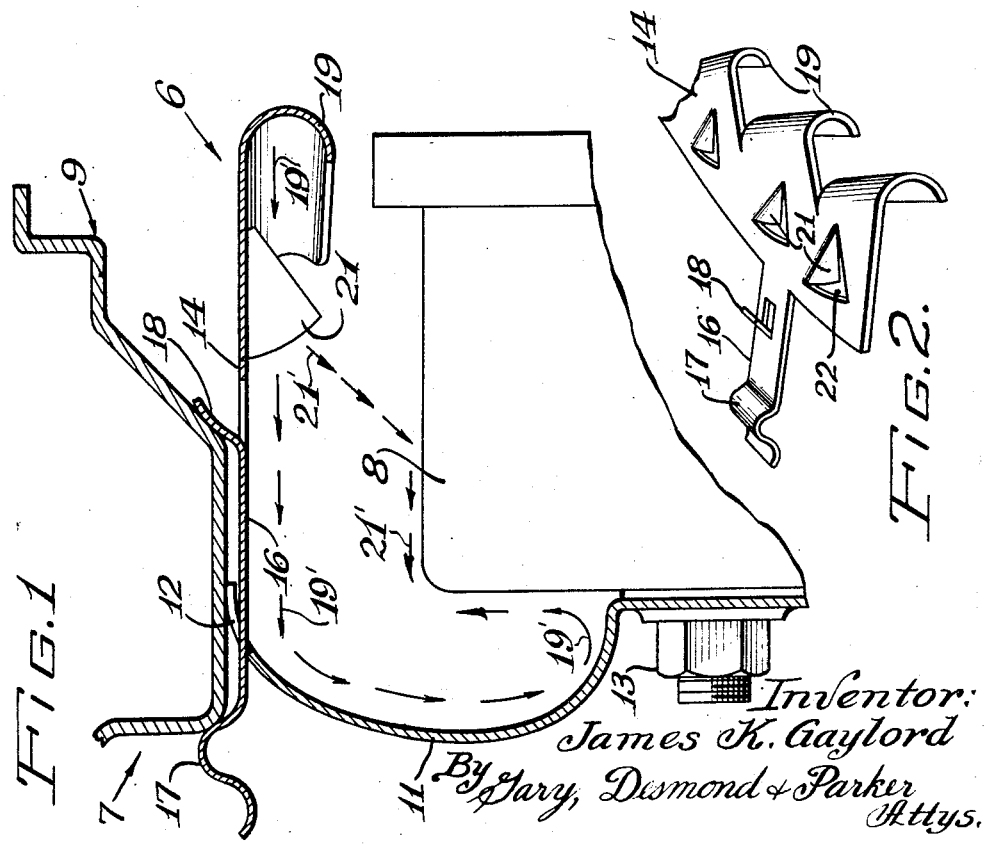
Inventor:
James K. Gaylord
By Gary, Desmond & Parker
Attys.

United States Patent Office 2,781,874
Patented Feb. 19, 1957

2,781,874

BRAKE DRUM COOLING DEVICE

James K. Gaylord, Chicago, Ill., assignor to Gaylord Products, Incorporated, Chicago, Ill., a corporation of Delaware Application December 29, 1953, Serial No. 400,887

2 Claims. (Cl. 188—264)

This invention relates to means for cooling automobile brake drums, and more particularly to devices adapted to be detachably mounted on the wheel of an automobile to direct streams of cool air against the outer surface of the brake drum during movement of the automobile.

It is well known in this art that the braking efficiency and service life of automobile brakes is greatly reduced by overheating during movement of an automobile down a long hill. To increase the braking efficiency and lengthen the service life of automobile brakes, it is an object of the invention to provide a device adapted to be mounted upon a wheel adjacent the outer periphery of a brake drum to direct streams of cool air against the outer surface of the brake drum.

Another object of the invention resides in the provision of a brake drum cooling device adapted to be readily mounted upon conventional automobile wheels without the use of special tools or equipment.

A further object of the invention resides in the provision of a brake drum cooling device which is relatively simple and inexpensive in construction and reliable in operation.

The invention embodies other novel features, details of construction and arrangement of parts which are hereinafter set forth in the specification and claims and illustrated in the accompanying drawings, wherein:

Fig. 1 is a fragmentary transverse sectional view illustrating a brake drum cooling device embodying features of the invention, the device being shown as applied to a conventional automobile wheel to direct streams of cool air against the outer surface of a brake drum.

Fig. 2 is a fragmentary perspective view showing a portion of the device.

Referring now to the drawings for a better understanding of the invention and more particularly to Figs. 1 and 2 therein, the cooling device, indicated generally at 6, is shown as applied to a conventional automobile wheel 7 to direct streams of cool air against the outer surface of a brake drum 8. The wheel 7 is shown as comprising a circular tire rim 9 secured to the periphery of a dish-shape body 11 formed with the usual circumferentially spaced chain slots 12 adjacent the tire rim. The brake drum 8 is secured against the inner side of the body 11 by the usual bolt and nut assemblies 13.

The brake drum cooling device 6 is shown as comprising a tubular body 14 having an outer diameter slightly less than the minor diameter of the tire rim 9. A plurality of resilient metal tongues 16 are provided at spaced intervals along one edge of the tubular body 14 for insertion through the chain slots 12 in the wheel body 11, the free end of each tongue being bowed at 17 for abutting engagement against the outboard side of the tire rim. A lug 18 is provided on each tongue 16 for abutting engagement against the inboard side of the tire rim.

A plurality of impeller blades 19 are provided along the inboard edge of the tubular body 14, the blades being formed and arranged to circulate streams of air axially toward the wheel and against the outer surface of the brake drum 8 as indicated by the arrows 19' in Fig. 1. The body 14 is also shown as cut and formed to provide circumferentially spaced fins 21 and apertures 22, the fins being operative to move streams of cool air through their respective apertures and against the brake drum during rotation of the wheel as indicated by the arrows 21' in Fig. 1.

While this invention has been shown in one form, it is obvious to those skilled in the art that it is not so limited, but is susceptible of various changes and modifications without departing from the spirit and scope of the claimed invention.

I claim:

1. In a rotatable automobile wheel, a brake drum, a tire rim encircling said drum, a brake cooling device comprising a generally tubular body disposed between said drum and rim, said body and drum defining an axial passageway, blades on said body to circulate air through said passageway responsive to rotation of the wheel, means detachably securing said device on the tire rim, said means comprising resilient arms circumferentially spaced on said body, and spaced abutments on each of said arms engaging opposite sides of said rim.

2. In a rotatable automobile wheel, a brake drum, a tire rim encircling said drum, a brake cooling device comprising a generally tubular body disposed between said drum and rim, said body and drum defining an axial passageway, blades on said body to circulate air through said passageway responsive to rotation of the wheel, and means detachably securing said device on the tire rim, said means comprising axially extending circumferentially spaced resilient arms on said body, said arms having abutment lugs engaging one side of the tire rim, the free ends of said arms being engaged against the opposite side of said rim.

References Cited in the file of this patent

UNITED STATES PATENTS

| | | |
|---|---|---|
| 2,489,522 | Chase | Nov. 29, 1949 |
| 2,599,707 | Gandelot | June 10, 1952 |
| 2,659,459 | Lyon | Nov. 17, 1953 |
| 2,659,460 | Lyon | Nov. 17, 1953 |
| 2,698,989 | Lyon | Jan. 11, 1955 |
| 2,701,037 | Lyon | Feb. 1, 1955 |

FOREIGN PATENTS

| | | |
|---|---|---|
| 870,183 | France | Dec. 5, 1941 |
| 572,202 | Great Britain | Sept. 27, 1945 |